United States Patent [19]

Shafer

[11] 3,709,106
[45] Jan. 9, 1973

[54] PISTON OPERATOR FOR IMPARTING ROTARY MOTION

[76] Inventor: Homer J. Shafer, 2300 W. Park Avenue, Mansfield, Ohio 44906

[22] Filed: Sept. 14, 1970

[21] Appl. No.: 72,018

[52] U.S. Cl. ..................92/138, 92/169, 251/58, 74/104, 277/188
[51] Int. Cl. ..........................F01b 9/00, F16k 31/16
[58] Field of Search ..........251/58; 92/138, 169, 136; 277/188; 74/104

[56] References Cited

UNITED STATES PATENTS

| | | | |
|---|---|---|---|
| 2,973,978 | 3/1961 | Oppenheim | 277/188 |
| 3,452,961 | 7/1969 | Forsman | 251/58 X |
| 3,460,799 | 8/1969 | Sanctuary | 251/58 X |
| 3,261,266 | 7/1966 | Ledeen et al. | 251/58 X |
| 3,056,573 | 10/1962 | Matheson et al. | 251/58 X |

FOREIGN PATENTS OR APPLICATIONS

| | | | |
|---|---|---|---|
| 1,242,974 | 8/1960 | France | 251/58 |

*Primary Examiner*—Arnold Rosenthal
*Attorney*—Hamilton, Renner and Kenner

[57] ABSTRACT

A linear piston operator having a housing made from preformed tubes enclosing two pistons connected in spaced relation, and a crank operatively connected to the piston connector for rotating an element as fluid pressure is applied selectively to the outer faces of the pistons. The cavity between the pistons in which the crank operates communicates with the rotary element and is completely enclosed for storing pressure fluid.

4 Claims, 5 Drawing Figures

PATENTED JAN 9 1973

INVENTOR.
HOMER J. SHAFER
BY Hamilton, Cook,
Renner & Kenner
ATTORNEYS

INVENTOR.
HOMER J. SHAFER
ATTORNEYS

PISTON OPERATOR FOR IMPARTING ROTARY MOTION

BACKGROUND OF THE INVENTION

U. S. Pat. No. 3,260,496 discloses a double piston operator for a butterfly valve, but the actuator plate connecting the pistons slides in a slot between two solid housing halves, so that there is no enclosed cavity between the pistons. Moreover, the force exerted by the pistons is applied to an offset roller at one side of the actuator plate, the roller being on the end of a crank on the valve stem which is slidable in a longitudinal slot in the actuator plate.

U. S. Pat. No. 1,517,728 shows a linear piston operator for a rotary plug valve having a crank connected to the valve stem. The other end of the crank is pivoted to a shaft connecting two spaced pistons, one of which is operated in a fluid cylinder to overcome the resistance of a spring against the other piston. Thus, the pressure is applied against one piston in one direction to hold the valve open and when the pressure is shut off, the spring moves the other piston in the opposite direction to close the valve. The shaft connecting the pistons and the crank arm connected thereto are not enclosed, so that there is no storage cavity between the pistons.

I am aware of a prior construction which employs a double acting single piston in which the piston rod is operatively connected to one end of a crank arm on the valve stem, but here again there is no enclosed storage cavity as the chambers on both sides of the piston are alternately pressure and exhaust fluid chambers.

In all of these prior constructions, the housing parts are castings or forgings, and are not adapted or intended to be made from preformed tubes or to store fluid under high pressure.

SUMMARY OF THE INVENTION

The improved linear piston operator for imparting rotary motion has a piston housing and a connected valve stem housing formed from preformed tubes in such a way as to form a cavity between the pistons for storing pressure fluid.

Another object of the invention is to provide pistons which are self-adjusting to compensate for slight misalignment between the ends of the cylinder enclosing the pistons.

A further object is to provide an improved connection between the crank arm and the shaft connecting the pistons to give increased mechanical efficiency.

These objects and ancillary objects are accomplished by the improved construction, a preferred embodiment of which is illustrated by way of example in the accompanying drawings and described in the specification hereof.

DESCRIPTION OF A PREFERRED EMBODIMENT

Figure 1:
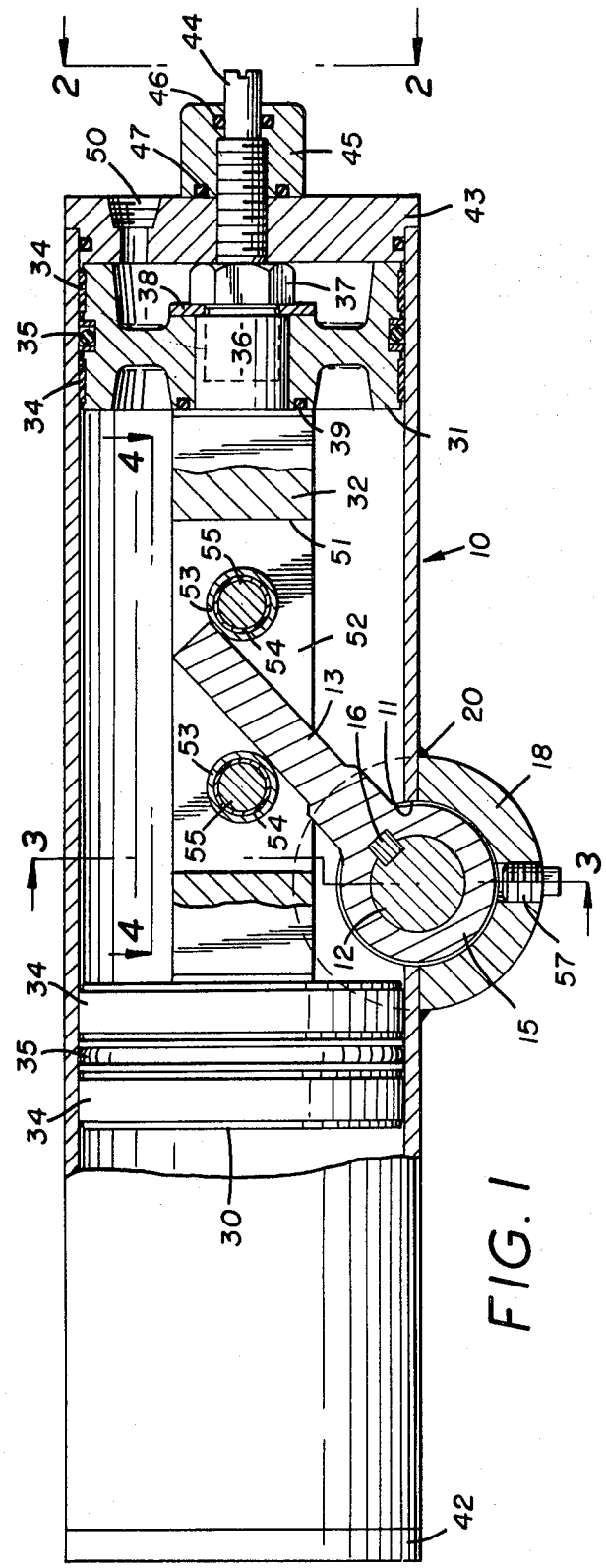
FIG. 1 is a longitudinal sectional view, partly in elevation, of the improved piston operator.
Figure 4:
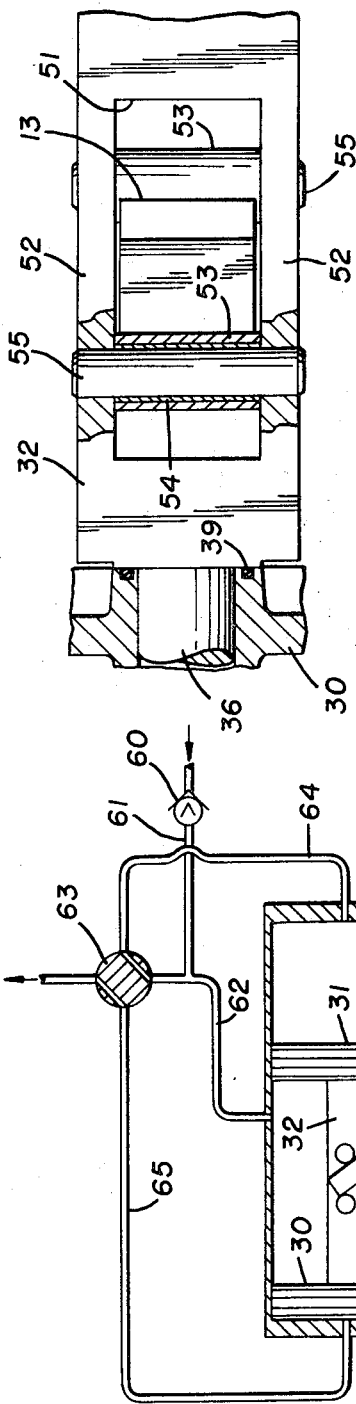
FIG. 4 is a fragmentary view partly in section on line 4—4 of FIG. 1.

The cylinder indicated generally at 10 is formed of standard steel tubing. Midway of the ends a transverse notch 11 is cut in one side of the cylinder, and the valve stem 12 extends through this notch. A crank arm 13 is welded to a collar 15 which is keyed at 16 to the valve stem 12.

The valve stem 12 is journaled in a transverse cylindrical housing 18 which covers over the notch 11 and has its inside wall cut out and shaped at 19 to conform to the walls of cylinder 10 adjacent to the notch. Thus, a continuous weld 20 may secure the housing 18 around the ends of the notch and along the side edges of the notch, to form a sealed enclosure for the valve stem 12 and its bearings.

The valve stem bearings 22 lie within housing 18 and encircle the stem on opposite sides of collar 15, with bearing rings 21 between abutting surfaces. The bearing members 22 have sleeve bearings 23 therein in which the shaft is journaled, with O-ring seals 24 at their outer ends. O-ring seals 24' are also provided between bearing 22 and housing 18. The bearings 22 have end flanges 25 which abut the ends of housing 18 and are secured thereto by screws 26 and 27, respectively. The screws 27 may be of sufficient length to also secure an annular bracket plate 28 to one flange 25, and the extension of the bracket plate 28 may be utilized for mounting on the valve housing of valve stem 12. Preferably, retainer rings 29 are provided in the stem 12 at the ends of flanges 25. As shown in phantom lines, the shaft 12 may be an extension coupled at C to the actual valve stem.

Within the cylinder 10 are two pistons 30 and 31 connected in spaced relation by a bar 32 and slidably mounted in the cylinder on opposite sides of the notch. The two pistons 30 and 31 are of identical construction and only piston 30 will be described in detail. The outer periphery of each piston preferably has two bearing bands 34 therein which may be of Teflon and an O-ring seal 35 between the bands. The Teflon bands act as thrust bearings opposing the angular force imparted to the bar 32 by the torque of the crank arm, and at the same time act as wiper rings to prevent any foreign material from entering between the pistons and the cylinder. The Teflon bands are self-lubricating and hence no lubricating oil need be injected into the cylinders to enhance their gliding movement over the interior surface of the cylinder.

The connecting bar 32 has cylindrical necks 36 at each end on which the pistons are mounted. The necks 36 extend through the pistons with a positive clearance of about 1/32 inch all around the bore in the piston. At the outer face of the hub of each piston, a stud 37 screwed into neck portion 36 clamps against a washer 38 to draw the shoulder of the bar 32 against the inner face of the piston hub, with an O-ring seal 39 in the hub face surrounding the portion 36 of the bar. Thus, the positive clearance between the reduced portions 36 of the connecting bar 32 and the pistons 30 and 31 compensates for any slight misalignment of the inner surface of cylinder 10 due to honing the cylinder from opposite ends, and prevents misalignment and binding of the pistons themselves.

The pistons 30 and 31 alternately abut against the heads 42 and 43 of the cylinder 10 at the ends of the stroke, and adjusting studs 44 are preferably provided in the heads to vary the stroke. The studs 44 preferably have caps 45 which embody sealing rings 46 and 47 around the studs and between the caps and piston heads. Tie bolts 48 extend through diametrically opposite ears 49 on the heads 42 and 43 to clamp them in abutment with the ends of cylinder 10. The heads 42 and 43 have ports 50 therein for conducting pressure fluid to and from the ends of the cylinder to reciprocate the pistons therein.

The connecting bar 32 has a central slot 51 receiving the free end of the crank arm 13 and the slot is formed by side portions 52 straddling the crank arm. Preferably, a pair of rollers extend transversely of the slot, one on each side of crank arm 13. The rollers may have hardened steel outer bushings 53 with inner bearing sleeves 54 preferably of Teflon, journaled on pins 55 having their outer ends secured in side portions 52.

In the position of the crank arm shown in FIG. 1, the right piston 31 is in abutment with head 43, the right roller is in abutment with the outer end or tip of crank arm 13, and the valve stem 12 may be in fully open or fully closed valve position. 6 If pressure fluid is introduced through port 50 in head 43, forcing the piston to the left, the right roller will rotate the crank arm counterclockwise through about 90° until the left piston abuts the head 42, during which stroke the port 50 in head 42 is open to exhaust. On the return stroke, flow of pressure fluid is reversed forcing the piston 30 to the right, and the left roller 53 rotates the crank arm 13 clockwise to return it to the position of FIG. 1.

Due to the position of the rollers at the start of the stroke in either direction, the lever arm rotating the valve stem is longest at the start of the stroke when the required torque is greatest. Thus, for example, if the valve element is under high pressure, requiring a high starting torque for opening the valve, the location and arrangement of the rollers 53 produce the greatest torque at the start of the opening movement. Where high starting torque is not required, the crank arm may have a Scotch yoke formation engaging a single roller on the connecting bar.

By reason of the fact that the cavity in cylinder 10 between the pistons 30 and 31 is sealed by the continuous weld 20, an excess supply of pressure fluid may be stored therein, and may be tapped when needed through the cylinder wall or by connection with the fitting 57 in the wall of housing 18. Because of the strength of the preformed tube 10 fluid at extremely high pressure may be stored.

Figure 5:
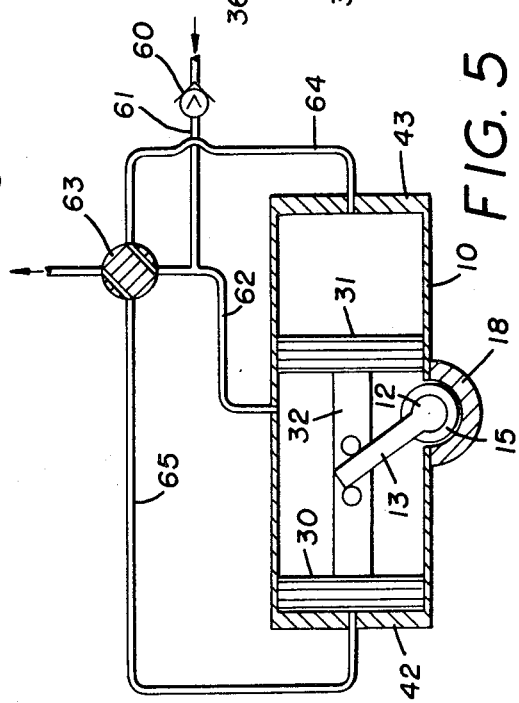
FIG. 5 is a diagrammatic view showing the improved piston operator connected in a fluid circuit.
Figure 2:
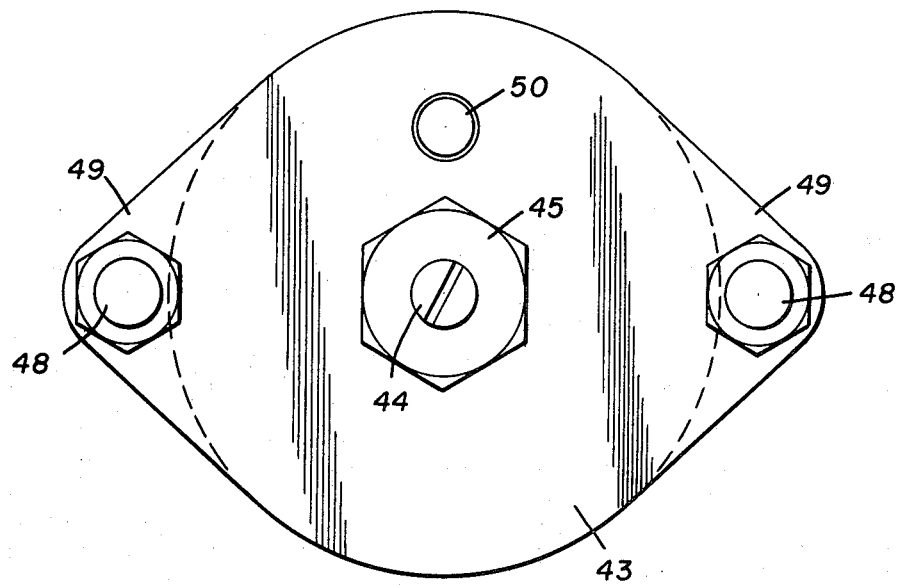
FIG. 2 is an end view on line 2—2 of FIG. 1.
Figure 3:
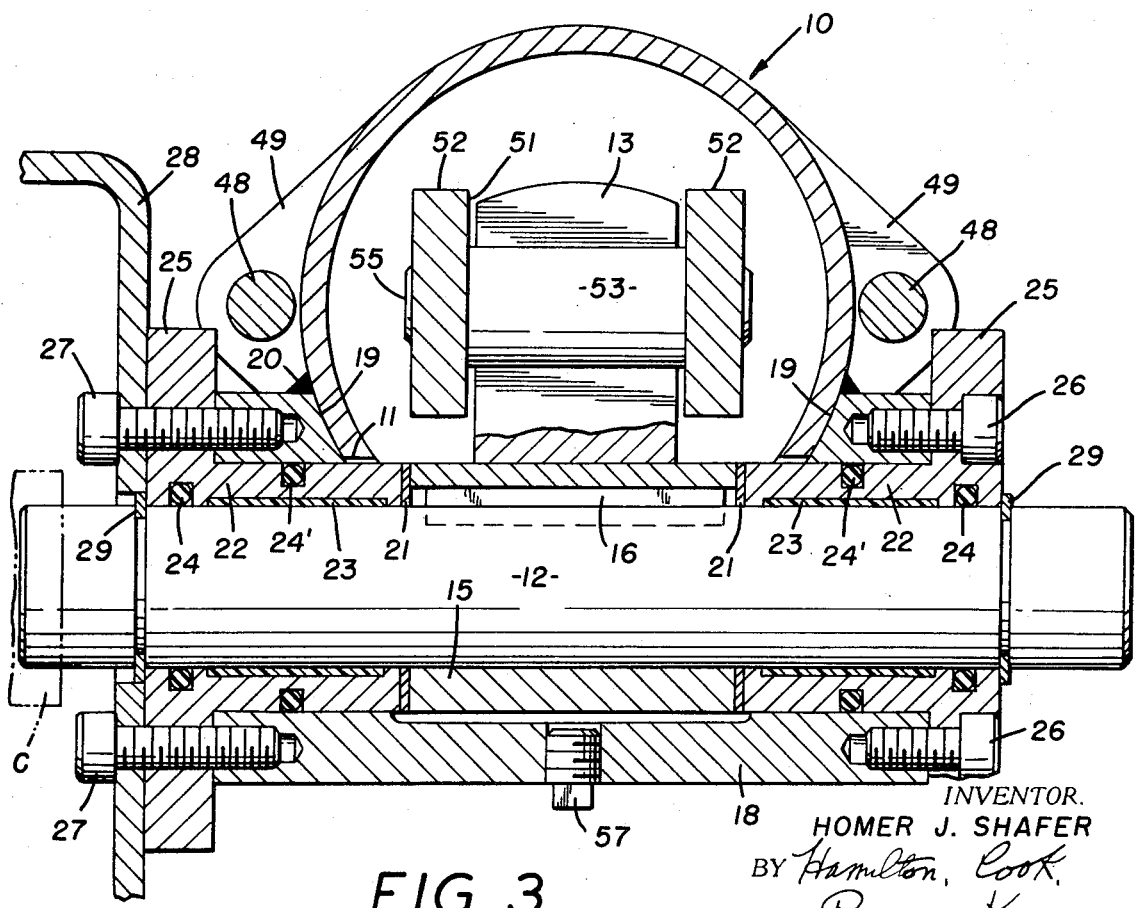
FIG. 3 is a cross sectional view on line 3—3 of FIG. 1.

One way of utilizing the excess stored pressure between the pistons is shown in FIG. 5. In this case the normal position of the valve stem 12 is shown with the pistons at one end of the stroke, the supply pressure passing through check valve 60 and supply line 61. Line 62 connects the supply line 61 with the cavity between the pistons and maintains line pressure therein. The supply pressure is also connected through four-way valve 63 and line 64 to the pressure side of cylinder 10. The exhaust line 65 from the cylinder is connected by valve 63 to exhaust.

Now if the pressure in line 61 fails, the valve 63 is operated to reverse the flow, connecting line 64 to line 62 to supply stored pressure from the cavity to the opposite side of cylinder 10, connecting line 64 to exhaust, and reversing the valve.

It will be seen that a simple and compact linear piston operator for imparting rotary motion is provided in which the principal parts are preformed tubes, the pistons are self-adjusting to compensate for slight misalignment of the cylinder bore, the cavity between the pistons is adapted to store pressure fluid, and improved connections between the piston assembly and the valve stem produce maximum starting torque.

What I claim is:

1. A linear piston operator for a rotary valve having a tubular housing comprising a preformed cylindrical tube, pistons in opposite ends of the housing, a bar within said housing connecting the pistons, said housing having a notch opening extending transversely thereof in one side only between said pistons, a tubular housing extending transversely of said piston housing covering said notch and having its wall on one side cut out conforming and welded to the exterior surfaces of the adjacent walls of said piston housing to form a sealed enclosure, a valve stem journaled in said transverse housing, and means operatively connecting said bar and said valve stem for imparting rotary movement to said valve stem when the pistons are moved linearly in said piston housing.

2. A linear piston operator as in claim 1, in which the means operatively connecting the bar and the valve stem comprises a crank arm on the valve stem having parallel linear sides and two spaced rollers on the bar selectively engage opposite sides of the crank arm as the pistons move in opposite directions.

3. A linear piston operator as in claim 2, in which said pistons each have spaced-apart Teflon bands glidably contacting the cylinder and an O-ring seal between the bands.

4. A linear piston operator as in claim 2, in which said pistons are adjustably mounted on said bar to compensate for misalignment between the pistons and cylinder.

* * * * *